United States Patent [19]

van der Gracht et al.

[11] Patent Number: 5,546,198
[45] Date of Patent: Aug. 13, 1996

[54] GENERATION OF SELECTIVE VISUAL EFFECTS

[76] Inventors: Joseph van der Gracht, 10941 Kathleen Ct., Columbia, Md. 21044; Ravindra Athale, 5311 Dunleigh Dr., Burke, Va. 22015

[21] Appl. No.: 316,492

[22] Filed: Sep. 30, 1994

[51] Int. Cl.$^6$ .................................................. G03H 1/00
[52] U.S. Cl. .................. 359/1; 359/3; 359/9; 359/29; 359/32
[58] Field of Search .................. 359/1, 2, 9, 13, 359/15, 22, 23, 25, 32, 466, 467, 567, 29, 30; 351/51, 52, 158

[56] References Cited

U.S. PATENT DOCUMENTS

| | | | |
|---|---|---|---|
| 3,711,183 | 1/1973 | Braunhut | 359/463 |
| 4,573,759 | 3/1986 | Swift | 359/32 |
| 4,715,702 | 12/1987 | Dillon | 351/44 |
| 4,830,441 | 5/1989 | Chang | 359/15 |
| 4,889,780 | 12/1989 | Cosner | 430/1 |
| 4,934,792 | 6/1990 | Tovi | 359/896 |
| 4,947,299 | 3/1990 | Lin | 362/161 |
| 5,002,364 | 6/1991 | Steenblik | 359/15 |
| 5,035,474 | 3/1991 | Moss | 359/13 |
| 5,191,449 | 3/1993 | Newswanger | 359/22 |
| 5,235,441 | 12/1993 | Georgaras | 359/15 |

FOREIGN PATENT DOCUMENTS 52-42129   1/1977   Japan .

OTHER PUBLICATIONS

Lohmann et al., "Binary Fraunhofer Holograms, Generated by Computer", Applied Optics, vol. 6, No. 10 pp. 1739–1748, Oct. '67.

van der Gracht, "Simple method for demonstrating Fraunhofer," Oct. 1994, American Joural of Physics pp. 934–937.

*Primary Examiner*—Paul M. Dzierzynski
*Assistant Examiner*—Darren E. Schuberg
*Attorney, Agent, or Firm*—Finnegan, Henderson, Farabow, Garrett & Dunner

[57] ABSTRACT

A method and a viewing device for generation of selective visual effects. The method entails encoding a holographic optical transparency for generating pre-selected patterns of light when stimulated by appropriate sources of light and a structure to enable viewing through such a transparency. The viewing device contains a suitably encoded holographic optical transparency and a structure produced with semi-rigid material which allow viewing of the natural scene through the transparency with two eyes. The encoding of the transparencies causes all limited extent light sources in a scene to be replaced with pre-selected patterns of light while producing minimal distortion in the remainder of the scene.

30 Claims, 2 Drawing Sheets

NATURALLY VIEWED SCENE

SCENE VIEWED USING INVENTION

GENERATION OF SELECTIVE VISUAL EFFECTS

BACKGROUND

1. Field of Invention

This invention relates to producing visual effects, and in a specific embodiment to devices placed or worn in relation to the eye to provide novel visual effects for various applications.

2. State of the Prior Art

When a semi-transparent film is placed in front of the eyes of a person, a scene as viewed by the person will be modified. In particular, holographic gratings have been placed in spectacle frames to produce a spreading of light of different colors. When these spectacles are worn by the person, the objects in a natural scene appear to be smeared along a line. When white light sources are present, the spectacles cause the light to spread in a multicolor streak along a single direction. In some products, the spectacles contains two such gratings for each eye arranged perpendicular to each other, thus causing the appearance of two streaks in perpendicular directions. These color-spreading spectacles are sold under a variety of trade names. The color-spreading spectacles are, however, unable to superimpose arbitrary, pre-selected patterns, such as letters of the alphabet or simple line drawings, on the scene. Furthermore, the gratings produce color separated smears of every object in the scene.

OBJECTS AND SUMMARY OF THE INVENTION

Accordingly it is an object of the invention to replace light sources of limited extent by arbitrary, pre-selected patterns, which are then superimposed onto a natural scene containing these light sources. It is a further object of the invention to simultaneously create a 3-D effect where the superimposed patterns appear to float in space within the natural scene. It is a further object of the invention to achieve these goals without producing objectionable distortion in viewing the natural scene.

The invention involves both a method and an apparatus for producing a preselected visual effect when used in combination with pre-selected light stimuli. Specifically, the invention comprises of: (a) selectively encoding a transparency, (b) locating or providing appropriate sources of visible light in the natural scene, and (c) combining the transparency with a structure for bringing it close to the user's eyes such that the desired visual effect is created when the light sources are viewed through the transparency. As an example, the transparency could be a computer generated hologram designed to produce the word "NOEL" in place of a limited extent visible light source. The transparency could then be mounted in spectacle frames. When these spectacles are used to view an arrangement of hundreds of decorative holiday lights placed on a tree, the user would see hundreds of copies of the word "NOEL" in place of each individual light on the tree superimposed on his natural view of the tree.

Furthermore, the pre-selected pattern of light appears to originate at the location of the point source when both eyes are used in a binocular arrangement. This causes the pattern of light to appear to float in space. When multiple point sources at different distances from the viewer are present, the 3-D effect is even further advanced since the viewer sees multiple copies of the pre-selected pattern appearing to originate at different distances. There are many uses of such a viewing device in addition to the application of viewing decorative holiday lights. The different uses of the viewing device derive from the different origins and arrangements of the limited extent light sources as well as different designs for the pre-selected patterns of light. The pre-selected patterns of light can range from text messages to cartoon-like drawings to corporate logos.

There are a number of commonly found scenes that have a rich supply of bright, limited extent points of light. Viewing fireworks is a particularly dramatic use of the viewing device. Fireworks contain hundreds of multicolor bright points of light first shooting up and then floating down. When viewing fireworks with the device, the viewer gets the visual sensation of each bright point surrounded by a pre-selected pattern of light such as the letters "USA" or a simple line drawing of a flag. Laser light shows also lend themselves to viewing with the device. Popular music shows routinely use dazzling arrays of bright points of light. Often, the lighting in such shows is designed to flash on and off to the beat of the music. The flashing in time of the lights creates a particularly dazzling effect. Carnivals and amusement parks are another excellent source of bright decorative arrays of light. We can also specifically arrange several limited extent fight sources of different color and pre-selected arrangements to produce unique visual effects when used in conjunction with the viewing device. The preceding list is not meant to be exhaustive but illustrative, and many more applications of the invention are possible.

DRAWING FIGURES

A more complete appreciation of the invention and its attendant advantages will be obtained by studying the following description in conjunction with the accompanying drawings.

DETAILED DESCRIPTION OF THE INVENTION

Figure 1:
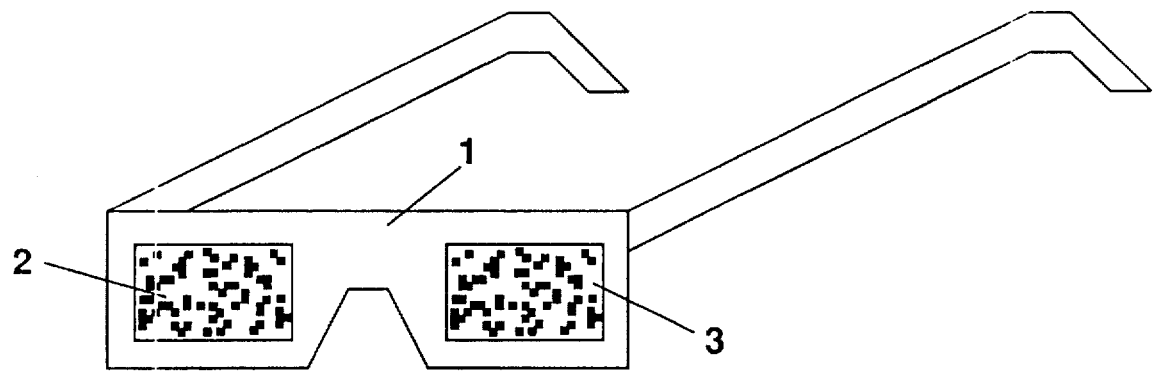
FIG. 1 shows a preferred embodiment of the invention where customized holographic transparencies have been inserted into spectacle flames.
Figure 2A:
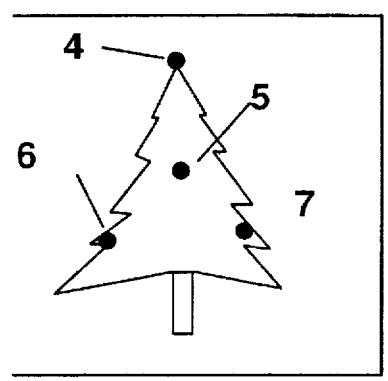
FIG. 2(a) depicts a view of a scene viewed without the invention.
Figure 2B:
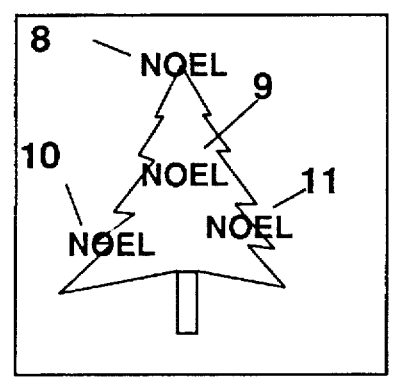
FIG. 2(b) depicts the view of the same scene viewed with the invention where the preselected pattern consists of letters arranged to form the word "NOEL".

Key aspects of one embodiment of the apparatus described in the invention are illustrated in FIG. 1. The apparatus is a viewing device consisting of a frame 1 with two specially designed transparencies 2 and 3 inserted in frame 1. The flame may be constructed out of cardboard, plastic, or any other suitable material. While frame 1 has been drawn to resemble standard spectacle frames, other possible embodiments include, but are not limited to, a close fitting eye mask and hand-held opera style frames. The method of using the apparatus is depicted in FIG. 2. FIG. 2(a) shows a scene with a rich supply of limited extent sources of light 4, 5, 6, and 7. FIG. 2(b) depicts the scene as it would appear to the viewer when the apparatus is used for viewing. In that figure, the pre-selected pattern is in the form of letters arranged to spell "NOEL". Compact light sources 4, 5, 6, and 7 have been replaced with pre-selected patterns 8, 9, 10, and 11 respectively.

Figure 3:
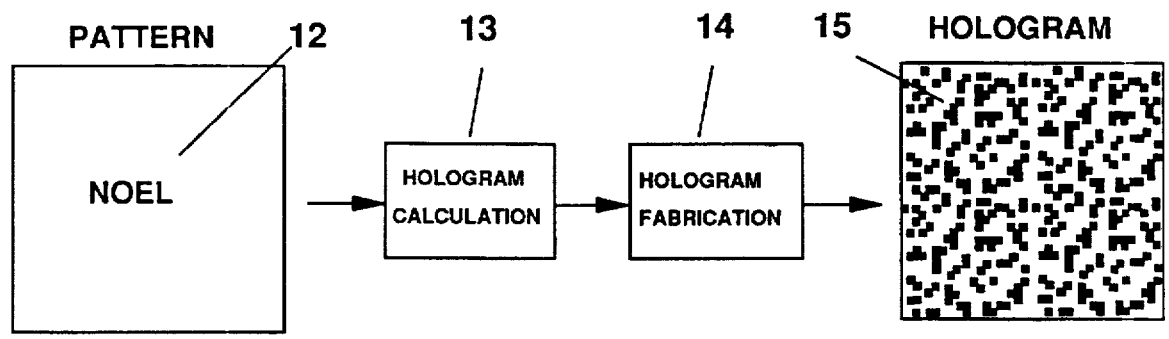
FIG. 3 depicts the method for producing computer generated holographic transparencies.

In FIG. 1, transparencies 2 and 3 can be optically or computer generated holograms. The method for producing the transparencies as computer generated holograms is depicted in. FIG. 3. The designer first selects a pattern 12 which, in this example, is the text "NOEL". Pattern 12 forms the input to a numerical algorithm 13 which calculates a computer generated hologram data file. The data file is transferred by a fabrication stage 14 to a transparency medium thus producing a computer generated holographic transparency 15. Computer generated holographic transparency 15 typically does not bear any resemblance to selected pattern 12. Two such computer generated holographic transparencies are then incorporated in a permanent or semipermanent manner to frame 1 as depicted in FIG. 1.

There are a variety of readily accessible algorithms for calculating computer generated hologram data files and it is not an objective of this invention to introduce new algorithms for generating such data files. The algorithm to be used, should be capable of generating data files used to produce far field (or Fourier transform) holograms. Such holograms are designed to reconstruct the desired pattern an infinite distance from the hologram when illuminated by a collimated light beam. One possible procedure for calculating the computer generated hologram data files is outlined as follows:

(a) select input pattern and represent it as a two dimensional matrix (A) of numbers, where each number represents the desired brightness of the corresponding point in the pattern and therefore only contains amplitude variations.

(b) multiply the matrix point-by-point by another two dimensional matrix (B) containing the same number of elements as matrix A, whose values comprise of randomly distributed phase value from zero to 360 degrees, and whose amplitude is uniformly equal to unity. The new matrix (C) will contain elements with both amplitude and phase variations.

(c) perform a two dimensional Fast Fourier Transform on the modified input matrix (C), which results in another two dimensional matrix (D) of complex numbers containing both amplitude and phase variations. The resulting two dimensional matrix D is the computer generated hologram data file.

As an example, we have followed this procedure where matrix A was selected to be of 128 by 128 size. The selected pattern was the letters "NOEL". Each letter was represented in the matrix A within a block 20 elements high and 10 elements wide. This matrix was then transformed using steps (b) and (c) outlined above to produce a new matrix D which contained 128 by 128 elements with both amplitude and phase variations. Matrix D is the computer generated hologram data file.

The next step as represented by fabrication step 14 is to transfer the computer generated hologram data file (matrix D) to an optical transparency resulting in a computer generated hologram. Ideally the amplitude values of matrix D will correspond to the absorption values of the transparency. Similarly, the phase values of matrix D will correspond to phase modulation values of the optical transparency. In practice, it is difficult to have complete, simultaneous control of the absorption and phase modulation of the optical transparency.

The three most common types of computer generated holograms are binary amplitude, binary phase, and multi-level phase. The designation of amplitude means that the final holographic transparency contains only absorption modulation. The designation of binary amplitude implies that the transparency contains only opaque and clear regions. When fabricating a binary amplitude computer generated hologram, a procedure is needed to map the matrix D into a binary amplitude matrix prior to transferring it to a an optical transparency. One mapping procedure is to discard the phase values of the elements of matrix D and replace each positive amplitude value with the value one and each negative amplitude value with the value zero. For this specific case of binary amplitude computer generated hologram, values of one result in clear regions on the transparency while values of zero result in opaque regions on the transparency in fabrication stage 14.

There are a number of well known procedures for transferring computer generated hologram data files containing only binary amplitude elements onto a transparency medium. Such a binary amplitude transparency can be generated directly by printing from the computer onto a high resolution printer that is capable of printing onto a transparency material. Alternatively, the computer generated hologram data file can be printed from the computer onto opaque paper. Standard photographic techniques can then be used to transfer the pattern from opaque hard copy to a transparency film with or without reduction in size.

Referring back to the example of the pattern "NOEL", we have followed the procedure of printing the computer generated hologram directly onto a transparency material. The 128 by 128 matrix of amplitude and phase values was mapped to a 128 by 128 matrix of ones and zeros as described above. The matrix was written directly onto a transparency film with each matrix element represented by a 10 micrometer by 10 micrometer opaque or clear spot on the film. This resulted in a 1.28 millimeter by 1.28 millimeter hologram that was replicated many times in each direction to create a larger hologram.

Higher light throughput and hence brighter reconstructed patterns can be achieved if binary or multi-level phase transparencies are used instead of binary amplitude transparencies. A number of well established procedures exist for mapping the amplitude and phase computer generated hologram data matrix D to a matrix containing elements with binary or multi-level phase variations alone. The matrix containing phase values alone can be transferred to optical transparency containing only phase modulation. Phase modulating transparencies appear to be clear but are made up regions of differing optical path lengths. The optical path length is the effective thickness of the medium as seen by light of a particular wavelength. There are two distinct ways of changing the optical path lengths in a material. The first way is by changing the physical thickness of the material while the second way is by changing the refractive index of the material. A binary phase hologram consists of regions having one of two allowable optical path lengths.

There are several established processes for producing such phase transparencies. In one method, amplitude masks are generated from the computer by printing the pattern onto a transparency in the same manner as described for the binary amplitude discussion. The amplitude transparency is converted using standard photolithographic techniques to a nickel embossing plate that contains a surface relief pattern that is proportional to the amplitude pattern originally recorded on the film. These nickel masters are then used in a stamping or embossing process to produce a corresponding surface relief pattern in mylar or other plastic film.

The function of the hologram in this invention is to reconstruct the pre-selected pattern and superimpose it on the natural scene at each compact source location. There is a tradeoff between producing very bright reconstructed patterns and maintaining good image quality for the rest of the scene. If the holograms are designed to replace limited extent light sources with very bright patterns, the other objects in the natural scene tend to become blurred. The binary amplitude hologram leads to sufficiently bright reconstructions for many intended applications while maintaining good image quality. For binary phase holograms, the optical path length difference between the two phase levels can be adjusted to tradeoff the pattern brightness against the image quality for the rest of the scene.

Both binary amplitude and binary phase holograms produce a sometimes undesirable symmetry in the reconstructed pattern. Specifically, the reconstructions are composed of the desired pattern along with a mirror image of the desired pattern. As an example, the desired pattern "NOEL" is accompanied by an upside down and backwards version of the pattern. The binary amplitude or binary phase hologram can be constructed to ensure that the mirror image does not lie on top of the desired image. Alternatively, the designer may choose to select only those patterns that have mirror symmetries. The use of multi-level phase holograms overcomes this restriction to symmetric patterns.

As discussed above, the scenes to be viewed must contain sources of limited extent in order to achieve the desired visual effect. The requirement of limited extent means that the sources subtend a small angle from the perspective of the viewer. This means that the sources may indeed be physically large, provided that the viewer stands far enough away such that the sources appear to be small with respect to the overall scene. Street lamps viewed from a distance of several hundred feet are an example of large sources that are sufficiently compact to be used with the viewing device. Small light sources, such as flashlight bulbs or light emitting diodes can be viewed at distances as small as ten inches.

VARIATIONS ON THE BASIC INVENTION

When both transparencies 2 and 3 are identical, the user sees the pre-selected pattern of light floating in space suggesting a 3-D effect. While the pattern does indeed appear to be floating in a 3-D space, the pattern itself appears to be flat. Instead of using identical transparencies, the transparencies can be designed to give left and right eye views of the desired pattern. The left and right eye views of an object can be generated using standard stereo pair generation techniques. Two holograms can be generated such that their reconstructions correspond to the two views of the desired 3-D pattern. The hologram corresponding to the left eye view is placed in the left aperture of the frame and the hologram corresponding to the right eye view is placed in the right aperture of the frame. This enhanced form of the invention will cause the user to see a 3-D representation of the pattern floating in the natural scene at the location of the limited extent light source.

Figure 4:
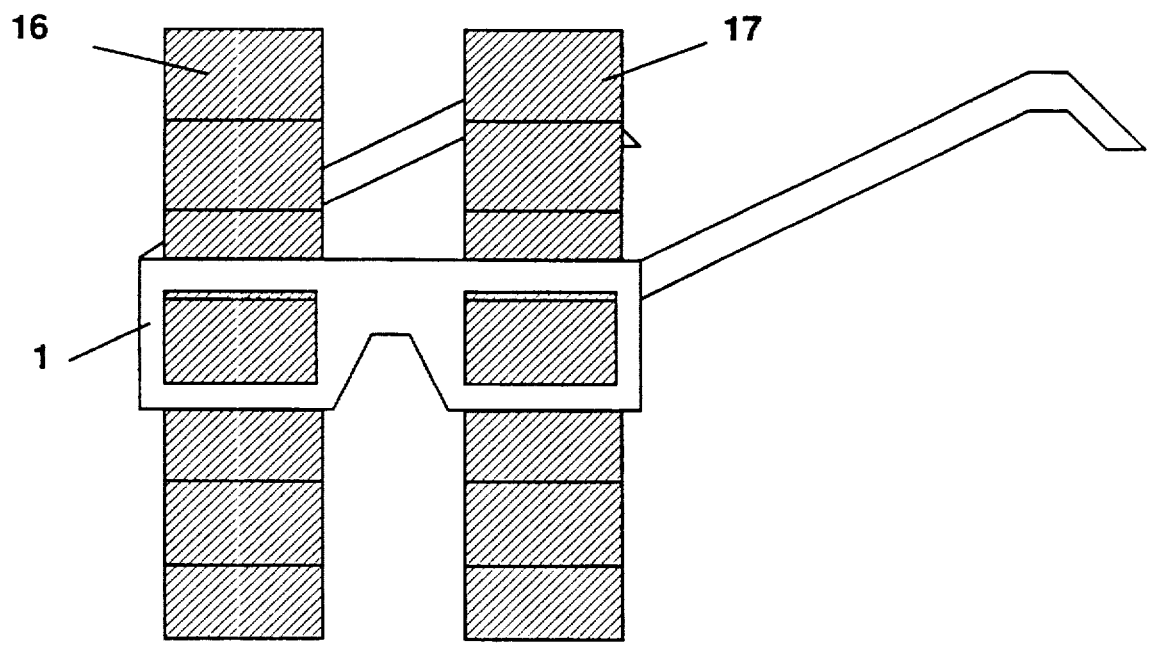
FIG. 4 depicts a variation of the invention allowing the viewer to select among several pre-selected patterns.

Another variation of the device would allow the user to easily insert new transparencies to allow viewing of different patterns. One possible embodiment of FIG. 4 shows a transparency strip 16 in the left aperture and a transparency strip 17 in the right aperture. Each transparency strip contains several different holograms and is inserted in the frames in such a manner as to allow mechanical motion of the transparency strip such that different holograms are present in the frame as the strip is moved. FIG. 4 shows only one possible embodiment of selecting different holograms. Another possible embodiment could employ a rotating wheel similarly containing several different holograms. By incorporating a mechanism for rapidly advancing individual hologram frames, a seamless (i.e. without shuttering between frames) animation effect can also be achieved.

SUMMARY, RAMIFICATIONS AND SCOPE

In summary, our invention meets the objectives of being able to superimpose preselected, arbitrary patterns on a natural scene wherever limited extent light sources are present without degrading the rest of the objects in the scene. Furthermore, the patterns appear to float in a 3-D space due to the binocular nature of the device invented.

Modifications of the foregoing invention can be made without departing from the spirit of the invention. For example, many variations in the designs of the flames, the mathematical methods for calculating the transparency function, the physical methods of producing the optical transparency, and the nature and configuration of the compact light sources can be envisioned.

Thus the scope of the invention should be determined by the appended claims and their legal equivalents rather than by the examples given in the discussion above.

We claim:

1. An optical device comprising:

an eyeglass frame having an aperture;

means for generating a desired superimposed graphic image on a natural scene including at least one source of electromagnetic radiation, said means for generating including a far field transmission hologram having said desired superimposed graphic image encoded therein, said far field transmission hologram including a transparent substrate with opaque portions selectively formed thereon in a pattern corresponding to said encoded superimposed image, said far field transmission hologram receiving electromagnetic radiation from said at least one source as an input and outputting said electromagnetic radiation to include a pattern corresponding to said desired superimposed image;

said far field transmission hologram is disposed in said aperture of said eyeglass frame.

2. An eyeglass comprising:

a frame having an aperture; and a far field transmission hologram provided in said aperture of said frame, said far field transmission hologram having a graphic image encoded therein, wherein, when said eyeglass is superimposed on a natural scene as viewed by said user through said hologram.

3. An eyeglass in accordance with claim 2, wherein said far field transmission hologram includes material having a predetermined pattern of optical phase variations.

4. An eyeglass in accordance with claim 2, wherein said far field transmission hologram is computer-generated.

5. An eyeglass in accordance with claim 2, wherein said far field transmission hologram is generated optically.

6. An eyeglass in accordance with claim 2, wherein said far field transmission hologram is a binary amplitude far field transmission hologram.

7. An eyeglass in accordance with claim 2, wherein said far field transmission hologram is a binary phase far field transmission hologram.

8. An eyeglass in accordance with claim 2, wherein said far field transmission hologram is a multilevel amplitude far field transmission hologram.

9. An eyeglass in accordance with claim 2, wherein said far field transmission hologram is a multilevel phase far field transmission hologram.

10. An eyeglass in accordance with claim 2, wherein said far field transmission hologram is encoded with alphanumeric information.

11. An eyeglass in accordance with claim 2, wherein said far field transmission hologram in said eyeglass is interchangeably mounted by said frame such as to be interchangeable with another far field transmission hologram.

12. An eyeglass in accordance with claim 2, wherein said frame includes a member mounting said far field transmission hologram and another far field transmission hologram for rotational movement into said viewing position.

13. An eyeglass in accordance with claim 2, wherein said far field transmission hologram and another far field transmission hologram are provided in first and second portions, respectively, of a transparent material carried by said frame.

14. An eyeglass in accordance with claim 2, wherein said eyeglass is a hand-held viewer.

15. An eyeglass in accordance with claim 2, wherein said frame further comprises another aperture, and said eyeglass further includes:

another far field transmission hologram provided in said another aperture of said frame, said another far field transmission hologram having another graphic image encoded therein, wherein when said eyeglass is disposed in said viewing position of said user, said another graphic image is superimposed on said natural scene as viewed by said user through said another aperture of said frame.

16. An eyeglass in accordance with claim 15, wherein said graphic image and said another graphic image are the same.

17. An eyeglass in accordance with claim 15, wherein said graphic image and said another graphic image are different.

18. A method of manufacturing an eyeglass, comprising:

generating a far field transmission hologram by altering at least one optical property of a substantially transparent substrate in a predetermined pattern, said predetermined pattern including an encoded graphic image; and providing said far field transmission hologram in an aperture of a frame of said eyeglass, whereby when said eyeglass is disposed in a viewing position of a user, said graphic image is superimposed on a natural scene as viewed by said user through said aperture of said eyeglass frame.

19. A method in accordance with claim 18, wherein said eyeglass is a hand-held viewer.

20. A method in accordance with claim 18, wherein said predetermined pattern of said at least one altered optical property includes a predetermined pattern of optical phase variations.

21. A method in accordance with claim 18, wherein said step of generating said far field transmission hologram is computer-aided.

22. A method in accordance with claim 18, wherein said step of generating said far field transmission hologram is performed optically.

23. A method in accordance with claim 18, wherein said far field transmission hologram is generated as a binary amplitude far field transmission hologram.

24. A method in accordance with claim 18, wherein said far field transmission hologram is generated as a binary phase far field transmission hologram.

25. A method in accordance with claim 18, wherein said far field transmission hologram is generated as a multilevel amplitude far field transmission hologram.

26. A method in accordance with claim 18, wherein said far field transmission hologram is generated as a multilevel phase far field transmission hologram.

27. A method in accordance with claim 18, wherein said step of generating said far field transmission hologram includes a step of encoding said far field transmission hologram with alphanumeric information.

28. A method in accordance with claim 18, further comprising the steps of:

generating another far field transmission hologram by altering said at least one optical property of a substantially transparent substrate in a predetermined pattern, said predetermined pattern corresponding to another graphic image; and providing said another far field transmission hologram in another aperture of said eyeglass frame, whereby when said eyeglass is disposed in a viewing position of a user, said another graphic image is superimposed on said natural scene as viewed by said user through said another aperture of said eyeglass frame.

29. A method in accordance with claim 28, wherein said graphic image is the same as said another graphic image.

30. A method in accordance with claim 28, wherein said graphic image is different than said another graphic image.

* * * * *

UNITED STATES PATENT AND TRADEMARK OFFICE
CERTIFICATE OF CORRECTION

PATENT NO. : 5,546,198
DATED : August 13, 1996
INVENTOR(S) : Joseph van der Gracht and Ravindra A. Athale It is certified that error appears in the above-identified patent and that said Letters Patent is hereby corrected as shown below:

In claim 2, at the sixth line (i.e., at col. 6, line 47), after "eyeglass is" insert --disposed in a viewing position of a user, said graphic image is--.

Signed and Sealed this

Thirteenth Day of July, 1999

Q. TODD DICKINSON

Attest:

Attesting Officer

Acting Commissioner of Patents and Trademarks